United States Patent [19]
Schwingle

[11] Patent Number: 6,010,291
[45] Date of Patent: Jan. 4, 2000

[54] COLLATABLE CAP NAIL

[76] Inventor: Shawn L. Schwingle, 1604 Walnut St., Peru, Ill. 61354

[21] Appl. No.: 09/240,538

[22] Filed: Jan. 29, 1999

[51] Int. Cl.[7] .............................. F16B 15/02; F16B 15/08
[52] U.S. Cl. ......................... 411/442; 411/480; 411/482; 206/344
[58] Field of Search .................................. 411/442, 443, 411/444, 469, 480, 482, 486; 206/343, 344, 345

[56] References Cited

U.S. PATENT DOCUMENTS

| | | | |
|---|---|---|---|
| 1,144,700 | 6/1915 | Edwards . | |
| 2,154,966 | 4/1939 | Vanderveer | 40/140 |
| 2,940,081 | 6/1960 | Julifs | 1/56 |
| 3,152,334 | 10/1964 | Lingle | 1/56 |
| 3,358,822 | 12/1967 | O'connor | 206/56 |
| 3,835,991 | 9/1974 | Brecht | 206/343 |
| 3,861,526 | 1/1975 | Leistner | 206/343 |
| 3,861,527 | 1/1975 | Perkins | 206/344 |
| 4,836,372 | 6/1989 | Shelton | 411/442 X |
| 5,056,976 | 10/1991 | Sygnator et al. | 411/442 |
| 5,255,898 | 10/1993 | Cacicedo | 411/480 X |
| 5,395,197 | 3/1995 | Cario et al. | 411/442 |
| 5,415,511 | 5/1995 | Damron | 411/480 |

FOREIGN PATENT DOCUMENTS 1917945  10/1970  Germany .

*Primary Examiner*—Neill Wilson
*Attorney, Agent, or Firm*—Leydig, Voit & Mayer, Ltd.

[57] ABSTRACT

A collatable cap nail which may be deployed with minimal wasted time and materials. The cap nail comprises a shank having a head at one end and a point at the opposite end. A cap is slidably fit over the shank. A pair of notches are formed at opposite edges of the cap. The notches are sized to receive the shanks of additional cap nails to thereby allow a tightly nestled arrangement of similarly formed cap nails. A strip of adhesive material may be used to join a plurality of cap nails, thereby forming a clip. The clip of cap nails may be loaded into a nail dispensing machine for rapid deployment.

20 Claims, 3 Drawing Sheets

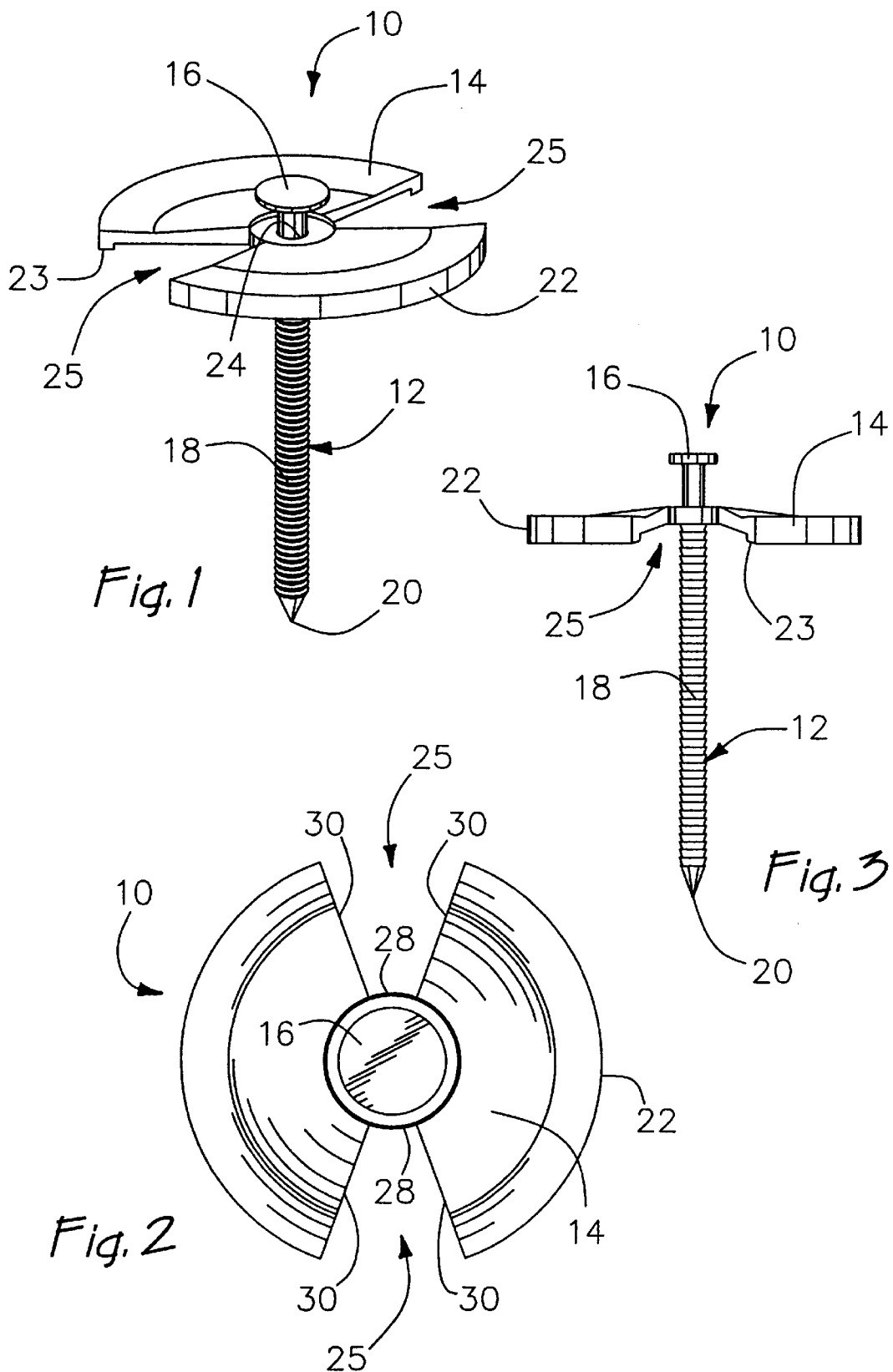

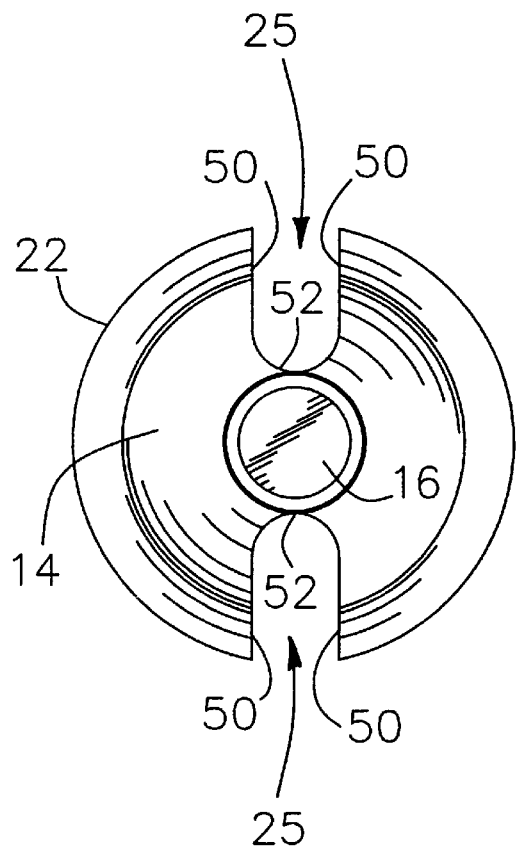
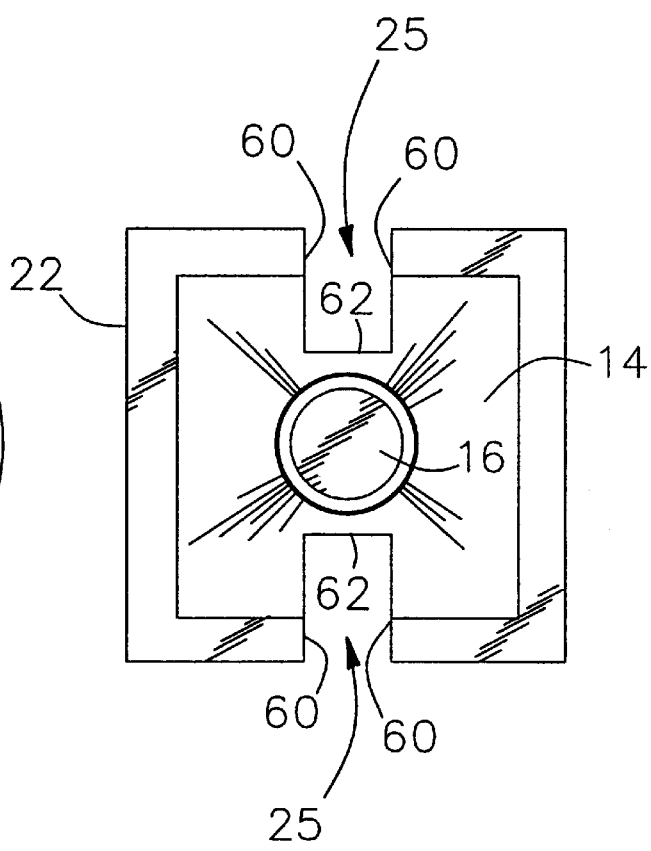
Fig. 7
Fig. 8

COLLATABLE CAP NAIL

FIELD OF THE INVENTION

The present invention generally relates to nails and more particularly relates to cap nails.

BACKGROUND OF THE INVENTION

Cap nails are often used to secure various types of home construction materials in place. For example cap nails are often used to secure roofing felt, house wrap, and foam insulation. Conventional cap nails typically comprise a relatively standard nail having a shank and head with a cap (or washer) inserted over the shank. The cap engages a larger area of the material and thereby reduces the magnitude of force exerted by the nail onto the material being secured. As a result, the use of cap nails to secure thin sheeting material reduces the incidence of tears or rips in the material and such nails are less likely to be driven through the material.

The nail itself is typically formed of steel or stainless steel, while the cap may be made from plastic, steel, or stainless steel. The cap often has a round shape, however square or other shapes are used as well.

Conventional cap nails are provided in boxes or buckets as a plurality of individual, loose units. During use, each individual cap nail is pulled from the container and held as it is hammered in place. Using such conventionally provided cap nails results in additional labor time needed to select and properly orientate each cap nail before hammering. Conventional cap nails may also be accidentally dropped, resulting in wasted materials and additional wasted time.

Similar problems have been addressed with regard to regular nails (i.e., nails not having caps) by providing them in collated nail strips. Collated regular nails, such as those described in U.S. Pat. No. 2,940,081 to Juilfs and U.S. Pat. No. 5,395,197 to Cario, et al., have modified heads which allow the nails to be assembled in a nestled arrangement. The modifications to the regular nail heads allow the nails to be placed more closely to one another while still providing adequate head surface against which a driving force may be applied to dispense the nail. Adhesive material is applied to the shanks of the nestled nails to thereby form a strip of collated nails suitable for use in a nail dispensing machine. As noted above, however, cap nails have a cap which is relative larger than the nail head, and therefore the head modifications disclosed in these patents are not effective for collating cap nails.

SUMMARY OF THE INVENTION

In light of the above, a general object of the invention is to provide a cap nail capable of being collated.

In that regard, it is an object of the present invention to provide a clip of multiple collated cap nails suitable for use in a nail dispensing machine.

A related object of the present invention is to provide a cap nail which allows a plurality of similar cap nails to be aligned in a nestled arrangement.

In accordance with the above objects, the present invention provides a collatable cap nail. The cap is inserted over the nail and has a pair of notches at opposite sides. The notches allow a plurality of similar cap nails to be aligned in a relatively tight or nestled arrangement. An adhesive material or similar connector joins the shanks of the nestled cap nails to provide a clip of collated cap nails.

The above-described cap nail clip may be loaded into a nail dispensing machine for rapid deployment. The nestled arrangement of the cap nails not only maximizes the number of cap nails which may be placed in a given space, thereby reducing the frequency of nail gun reloads, but also minimizes the necessary strength of the adhesive material holding the nails together in clip form.

These and other aims, objectives, and features of the invention will become more apparent from the following detailed description when taken in conjunction with the accompanying drawings.

BRIEF DESCRIPTION OF THE DRAWINGS

FIG. 1 is a perspective view of a cap nail in accordance with the present invention.

FIG. 2 is a top view of the cap nail of FIG. 1.

FIG. 3 is a side elevational view of the cap nail taken along line 3—3 of FIG. 2.

FIG. 7 is a top view of a cap nail in accordance with the present invention having an alternative notch shape.

FIG. 8 is a top view of a cap nail in accordance with the present invention having alternative cap and notch shapes.

Figure 4:
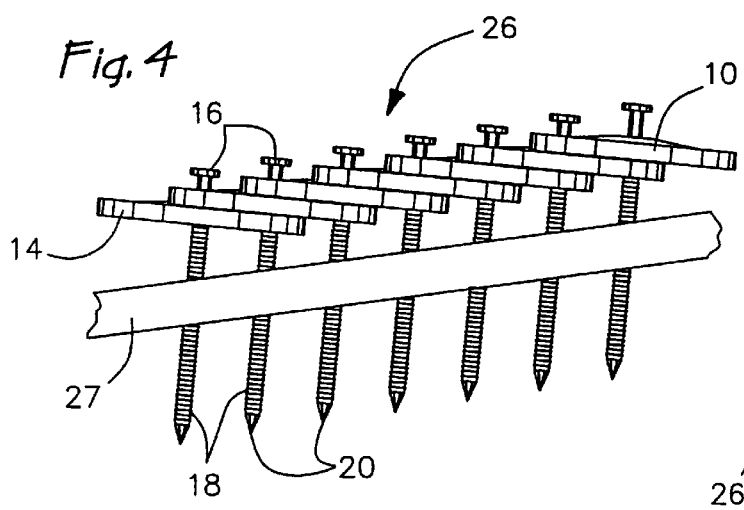
FIG. 4 is a side view of a clip of similarly formed cap nails in accordance with the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENTS

A cap nail 10 in accordance with the present invention is shown in FIGS. 1–3. The cap nail compromises a nail 12 and cap (or washer) 14. The nail 12 has a head 16 and a shank 18 terminating with a point 20. The head 16 extends radially from the shank 18 to define a lateral surface which, in the absence of the cap 14, would engage a portion of the material to be secured. While the shank 18 is illustrated in FIGS. 1–3 as having a circular cross-section, square or other shapes may also be used without departing from the present invention. According to the embodiment illustrated in FIG. 1, the cap 14 has a generally circular outer edge 22. A central aperture 24 is sized to closely fit the shank 18 of the nail 12 so that the cap 14 slidingly engages the nail.

The cap 14 has a large engaging surface for distributing the force of the nail 12 and thereby reducing tears in the material being secured. As best shown in FIGS. 1 and 3, the cap 14 extends generally radially from the shank 18 to provide a surface for engaging the material to be secured. The engaging surface of the cap 14 is larger than the lateral surface of the nail head 16 so that the force of the nail 12 is distributed over a larger area. The larger surface not only reduces the likelihood of tears in the material, but also prevents the cap nail from being driven through or crushing certain materials, such as foam insulation. In the currently preferred embodiment, the bottom of the cap 14 has a depending ridge 23 near the outer edge 22 which provides a distinct engaging surface.

In accordance with the present invention, a pair of notches 25 are formed in the cap and sized to receive the shank of another cap nail. The term notch as used herein is intended to encompass all forms of slots, indentations, niches, and other recesses formed in the cap 14 which reduce the distance between the outer edge 22 of the cap and the nail 12. The notches are formed in opposite sides of the cap 14 to thereby allow a strip 26 of such cap nails to be closely packed together (FIG. 4).

As best shown in FIG. 2, the notches of the illustrated embodiment have a generally trapezoidal shape. According to the illustrated embodiment, each notch is defined by a relatively short inner wall surface 28 and a pair of generally diverging side walls 30. While the illustrated trapezoidal shape is currently preferred, a number of other notch shapes may also be used in accordance with the present invention. For example, each notch 25 may have parallel side walls 50 and a radiused inner wall surface 52, as illustrated in FIG. 7. Another alternative shape is shown in FIG. 8, where the notches 25 are illustrated as having parallel side walls 60 and flat inner wall surfaces 62 to form rectangular indents in the cap 14. Regardless of the notch shape, the inner wall surface is most preferably at least as wide as the shank 18 of the nails 12 to allow the closest arrangement of nails in a strip. FIG. 8 further depicts a cap 14 having a generally rectangular shape, as opposed to the circular caps shown in the other figures. The caps 14 may be formed in these or other shapes, in accordance with the present invention.

Although cap nail 10 is illustrated as having two notches, other notch patterns may be used in accordance with the present invention. The caps 14 may have a single notch 25 which allows the cap nails 10 to be assembled in a partially nestled arrangement. The caps 14 further may have more than two notches, which allow a fully nestled arrangement, similar to that shown in FIGS. 4–6 for the two-notch embodiment. It will be appreciated, however, that the number of cap nails 10 which may be collated in a given space is maximized if the notch pattern incorporates pairs of notches disposed opposite one another (i.e., spaced at 180° in relation to the nail). An opposing notch pattern also allows the cap nails 10 to be assembled in a linear arrangement suitable for use with a nail dispensing machine. It will be further appreciated that additional notches reduce the lateral surface of the cap 14, thereby reducing the force distributing characteristics of the cap. Accordingly, while other notch patterns may be used, caps having two notches spaced at opposite sides are currently preferred.

Figure 6:
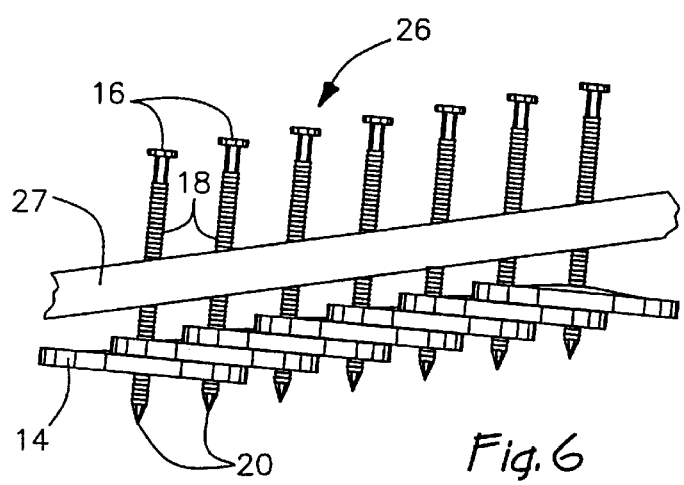
FIG. 6 is a side view of a clip of cap nails similar to FIG. 4 but having an alternative cap position on each nail.
Figure 5:
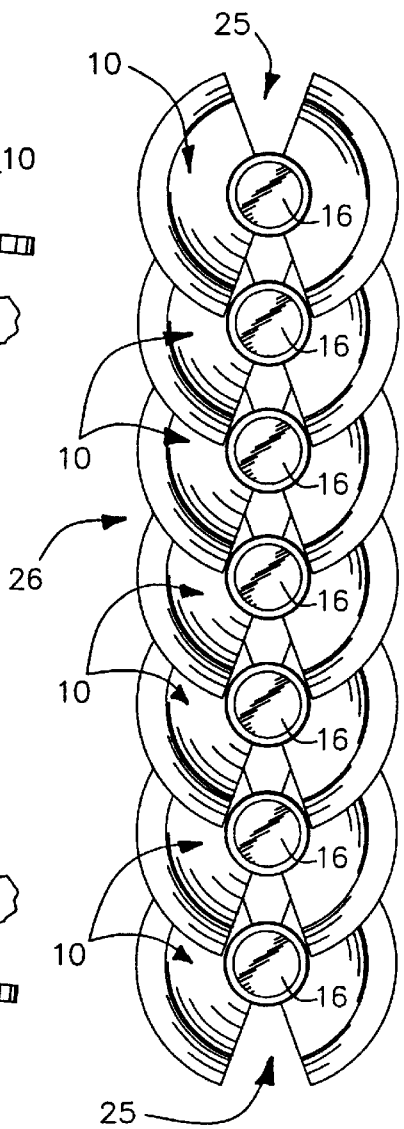
FIG. 5 is a top view of the clip of cap nails taken along line 5—5 of FIG. 4.

To form a clip 26, a plurality of cap nails 10 are arranged in a nestled array and adhered together as shown in FIGS. 4 and 5. Each cap nail 10 has the notched cap 14 as described above, allowing multiple cap nails to be aligned in close proximity to thereby form a nestled array. A strip of adhering medium 27 holds the cap nails 10 in place with respect to one another to thereby form the clip 26. The adhering medium 27 may take the form of strips of paper material bonded to the nail shanks 18 with an adhesive. Other materials, such as strips of adhesive tape and hot melt adhesive, may also be used to hold the clip 26 together. It will further be appreciated that the adhering medium 27 may take the form of plastic material molded around the shanks 18. The caps 14 may be positioned near the nail head 16 and above the strip 27 as shown in FIG. 4 or, alternatively, near the point 20 below the strip 27 as is currently preferred (FIG. 6). The caps 14 may be spaced so that adjacent caps overlap one another to form overlapping portions, as best illustrated in FIG. 5. An adhesive may also be deposited at the overlapping portions of the caps 14 to thereby hold the caps at the desired location along the nail shanks 18. A clip 26 of collated cap nails 10 may be fed into a nail dispensing machine for rapid deployment of the cap nails. The nail dispensing machine may be similar to previously known nail guns that are modified to accept the caps 14 of the cap nails 10.

In light of the above, it will be appreciated that the present invention brings to the art a new and improved cap nail which may be deployed with minimal wasted time and materials. Notches are formed in opposite of the cap which allow the cap nails to be placed in a relatively tight arrangement. A strip of adhesive material connects the cap nails to form a clip which may be fed into a nail dispensing machine for rapid deployment. As a result, the present invention eliminates the need to individually grasp and hold each cap nail during construction operations. Furthermore, the cap nails of the present invention are less likely to be dropped thereby minimizing material waste.

What is claimed is:

1. A clip of collatable cap nails comprising:
   a plurality of nails, each nail having an elongate shank and a head, the head being attached to one end of the shank and defining a lateral surface;
   a plurality of caps, one cap for each nail, each cap having a generally circular shape defined by an outer edge, the outer edge further defining an engaging surface that is larger than the lateral surface of the head, the cap comprising a central aperture sized to slidingly engage the shank, and first and second recesses forming reduced radius areas in opposite sides of the cap, each recess defined by opposing side walls connected by an inner wall, each of the first and second recesses further having a width sized to accept an additional shank; and
   a strip securing the nails closely together in an array, wherein the recesses of the caps receive the shanks of adjacent nails.

2. The clip of cap nails of claim 1 in which the opposing side walls are angled with respect to one another to form recesses of generally trapezoidal shape.

3. The clip of cap nails of claim 1 in which the opposing side walls are substantially parallel to one another.

4. The clip of cap nails of claim 1 in which the inner wall has a radius.

5. The clip of cap nails of claim 1 further comprising a ridge depending from a bottom side of the cap and near the outer edge.

6. The clip of claim 1 in which the caps are positioned near the nail heads and the strip is located at middle portions of the shanks.

7. The clip of claim 1 in which the caps are positioned on the shanks near the end opposing the nail head and the strip is located at middle portions of the shanks.

8. A clip of collatable cap nails comprising:
   an array of elongate shanks;
   a plurality of heads, one head attached to one end of a corresponding one of the shanks, each head having an outer perimeter;
   a plurality of caps positioned over the array of shanks, each cap having an outer perimeter larger than that of each corresponding head, each cap having a pair of notches disposed at opposite sides, wherein each cap nail is formed by one cap, one head and one shank; and
   means for securing the cap nails in the array, with the shanks of the cap nails being received into the notches of the caps of adjacent cap nails.

9. The clip of claim 8 in which each notch is defined by opposing side walls connected by an inner wall, wherein the opposing side walls are angled with respect to one another to form recesses of generally trapezoidal shape.

10. The clip of claim 8 in which each notch is defined by opposing side walls connected by an inner wall, wherein the opposing side walls are substantially parallel to one another.

11. The clip of claim 8 further comprising a ridge depending from a bottom side of the cap and near the outer edge.

12. The clip of claim 8 in which adjacent caps partially overlap one another to form overlapping portions, and wherein the means for securing comprises adhesive deposited at the overlapping portions.

13. The clip of claim 8 wherein the means for securing comprises a strip attached to the nail shanks.

14. A clip of collated cap nails comprising:

a nestled array of nails, each nail comprising a shank with a head at one end and a point at an opposite end, the head defining a lateral surface;

a cap slidably attached to each shank and having a central aperture sized to closely fit the shank; an outer edge defining an engaging surface greater than the lateral surface of the head; and a pair of notches formed in the outer edge and spaced at opposite ends of the cap; and an adherent material attached to the nail shanks.

15. The clip of claim 14 in which the adherent material comprises a pair of paper strips attached to opposite sides of the shanks with adhesive.

16. The clip of claim 14 in which the adherent material comprises plastic material.

17. The clip of claim 14 in which each notch has a width sized to accept an adjacent nail shank.

18. The clip of claim 14 in which the caps are positioned near the nail heads and the adherent material is located at middle portions of the shanks.

19. The clip of claim 14 in which caps are positioned near the nail points and the adherent material is located at middle portions of the shanks.

20. The clip of claim 14 in which adjacent caps partially overlap one another to form overlapping portions, the clip further comprising adhesive deposited at the overlapping portions.

\* \* \* \* \*